(12) United States Patent
Al Sayeed et al.

(10) Patent No.: US 10,560,212 B2
(45) Date of Patent: Feb. 11, 2020

(54) SYSTEMS AND METHODS FOR MESH RESTORATION IN NETWORKS DUE TO INTRA-NODE FAULTS

(71) Applicant: Ciena Corporation, Hanover, MD (US)

(72) Inventors: Choudhury A. Al Sayeed, Stittsville (CA); Dominic Richens, Perth (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/985,114

(22) Filed: May 21, 2018

(65) Prior Publication Data
US 2019/0356407 A1    Nov. 21, 2019

(51) Int. Cl.
*H04B 10/038* (2013.01)
*H04J 14/02* (2006.01)

(52) U.S. Cl.
CPC ...... *H04J 14/0268* (2013.01); *H04J 14/0272* (2013.01); *H04J 14/0295* (2013.01); *H04J 14/0284* (2013.01); *H04J 2203/006* (2013.01)

(58) Field of Classification Search
CPC ............................................. H04B 10/03–038
See application file for complete search history.

(56) References Cited

U.S. PATENT DOCUMENTS

| 9,236,953 | B2 | 1/2016 | Chhillar et al. |
| 9,451,343 | B2 | 9/2016 | Prakash et al. |
| 9,577,763 | B2 | 2/2017 | Al Sayeed et al. |
| 9,806,803 | B2 | 10/2017 | Bownass et al. |
| 9,882,634 | B1 | 1/2018 | Al Sayeed et al. |
| 9,918,148 | B2 | 3/2018 | Swinkels et al. |
| 2004/0153529 | A1* | 8/2004 | Rikitake ............... H04J 3/14 709/220 |
| 2011/0200324 | A1 | 8/2011 | Boertjes et al. |
| 2014/0112660 | A1 | 4/2014 | Al Sayeed et al. |
| 2014/0328583 | A1 | 11/2014 | Al Sayeed et al. |
| 2015/0055952 | A1* | 2/2015 | Younce ............... H04J 14/0212 398/48 |
| 2015/0117858 | A1 | 4/2015 | Al Sayeed et al. |
| 2016/0036520 | A1 | 2/2016 | Swinkels et al. |
| 2017/0085316 | A1 | 3/2017 | Al Sayeed et al. |
| 2017/0163489 | A1 | 6/2017 | Prakash et al. |
| 2018/0006757 | A1 | 1/2018 | Prakash et al. |
| 2018/0076882 | A1 | 3/2018 | Prakash et al. |
| 2019/0007131 | A1* | 1/2019 | Satyarthi ............... G06F 3/0625 |

* cited by examiner

*Primary Examiner* — Shi K Li
(74) *Attorney, Agent, or Firm* — Clements Bernard Walker; Christopher L. Bernard; Lawrence A. Baratta, Jr.

(57) ABSTRACT

Systems and methods are in a node in a network utilizing a control plane for triggering mesh restoration due to intra-node faults, and include monitoring at least one channel at a degree at a plurality of degrees associated with the node; detecting a fault on the at least one channel, wherein the fault is an intra-node fault upstream of the degree; and transmitting a channel fault indicator downstream of the fault to at least one downstream node along a path of the faulted channel, wherein restoration is triggered based on the channel fault indicator.

19 Claims, 9 Drawing Sheets

SYSTEMS AND METHODS FOR MESH RESTORATION IN NETWORKS DUE TO INTRA-NODE FAULTS

FIELD OF THE DISCLOSURE

The present disclosure generally relates to networking systems and methods. More particularly, the present disclosure relates to systems and methods for triggering mesh restoration in networks due to intra-node faults, such as where a node is partially faulted preventing connectivity through only a subset of the node.

BACKGROUND OF THE DISCLOSURE

Networks, such as using Dense Wave Division Multiplexing (DWDM), Optical Transport Network (OTN), Ethernet, Multiprotocol Label Switching (MPLS), and the like, are deploying control plane systems and methods. Control planes provide an automatic allocation of network resources in an end-to-end manner. Example control planes may include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is a signaling and routing protocol similar to Private Network-to-Network Interface (PNNI) and Multi-Protocol Label Switching (MPLS); or any other type control plane for controlling network elements at multiple layers, and establishing connections among nodes. Control planes are configured to establish end-to-end signaled connections such as Subnetwork Connections (SNCs) in ASON or OSRP, and Label Switched Paths (LSPs) in GMPLS and MPLS. Note, as described herein, SNCs and LSPs can generally be referred to as services or calls in the control plane. Control planes use available paths to route the services and program the underlying hardware accordingly.

At the optical layer (also referred to as the photonic layer, DWDM layer, Layer 0, etc.) the distributed control plane architecture for Layer 0, restoration (where every Optical Add/Drop Multiplexer (OADM) node effectively works as a control plane node) fails to trigger restoration for individual optical channels, when communication is lost with an intermediate control plane node on the channel path. The existing control plane framework can only handle restoration in such scenario if an optical line failure is detected at both neighboring degrees of the troubled node. As is known in the art, an OADM node can have one or more degrees and each degree represents an optical path of ingress in and egress from the OADM node. In any other case, such as an electrical power down on a control plane enabled shelf or a shelf processor failure in an intermediate node (such failures only affecting a subset of degrees of the OADM node), downstream control plane nodes do not receive any fault notification from upstream control plane nodes, and similarly, upstream originating nodes lose their visibility on faults taking place downstream of the faulted node. As a result, on a traffic fault, originating Layer 0 control plane nodes fail to take appropriate actions to restore optical channels on a different path.

That is, when not all channels are faulted, the control plane cannot trigger restoration for an individual or a partial set of channels when there is no line fault detected or no line fault notification is received from other control plane nodes. An all-channel fault would have indicated a potential line fault. With a partial set of channel fault, a control plane originating node does not know where the fault is coming from. For example, this can be because a control plane node processor is down in an intermediate node, all the fault propagation (in-band communications) cannot bypass the faulty node.

BRIEF SUMMARY OF THE DISCLOSURE

In an embodiment, a method is implemented in a node in a network utilizing a control plane for triggering mesh restoration due to an intra-node fault. The method includes monitoring at least one channel at a degree at a plurality of degrees associated with the node; detecting a fault on the at least one channel, wherein the fault is an intra-node fault upstream of the degree; and transmitting a channel fault indicator downstream of the fault to at least one downstream node along a path of the faulted channel, wherein restoration is triggered based on the channel fault indicator. The restoration can include rerouting the faulted channel exclusive of the fault which is internal to the node. A rerouted path for the faulted channel can still traverse the node through other non-faulted degrees exclusive of the fault. The fault can be an intra-node fault that affects degree-to-degree connectivity and includes any of a fiber fault, a power failure on a shelf or on active components of an associated degree, and a loss of communication with a control plane processor. The channel fault indicator can include a unique node identifier, a from degree port, a to degree port, and a type of the fault. The plurality of degrees can be implemented in separate hardware such that the fault is a partial failure of one part of the separate hardware. The method can further include receiving a second channel fault indicator from an upstream node for a second channel; and transmitting the second channel fault indicator downstream of the second fault to at least one remaining downstream node along a path of the second faulted channel and suppressing a subsequent channel fault indicator from the node. Each degree can include one of i) an Optical Service Channel (OSC) and ii) equipment for signaling over a signaling channel or in-band, for communication to associated adjacent nodes, wherein the transmitting is over the OSC, the signaling channel, or in-band.

In another embodiment, an apparatus is disposed in a node in a network utilizing a control plane for triggering mesh restoration due to an intra-node fault. The apparatus can include circuitry configured to monitor at least channel at a degree of a plurality of degrees associated with the node; circuitry configured to detect a fault on the at least one channel, wherein the fault is an intra-node fault upstream of the degree; and circuitry configured to cause transmission of a channel fault indicator downstream of the fault to at least one downstream node along a path of the faulted channel, wherein restoration is triggered based on the channel fault indicator. The restoration can include rerouting the faulted channel exclusive of the fault which is internal to the node. A rerouted path for the faulted channel can still traverse the node through other non-faulted degrees exclusive of the fault. The fault can be an intra-node fault that affects degree-to-degree connectivity and includes any of a fiber fault, a power failure on a shelf or on active components of an associated degree, and a loss of communication with a control plane processor. The channel fault indicator can include a unique node identifier, a from degree port, a to degree port, and a type of the fault. The plurality of degrees can be implemented in separate hardware such that the fault is a partial failure of one part of the separate hardware. The apparatus can further include circuitry configured to receive a second channel fault indicator from an upstream node for a second channel; and circuitry configured to cause transmission of the second channel fault indicator downstream of the second fault to at least one remaining downstream node along a path of the second faulted channel and suppressing a subsequent channel fault indicator from the node. Each degree can include one of i) an Optical Service Channel (OSC) and ii) equipment for signaling over a signaling channel or in-band, for communication to associated adjacent nodes, wherein the transmitting is over the OSC, the signaling channel, or in-band.

In a further embodiment, an Optical Add/Drop Multiplexer (OADM) node in an optical network utilizing a control plane for triggering mesh restoration due to an intra-node fault includes a plurality of degrees each including an OADM structure; a plurality of intra-node connections between the plurality of degrees; an Optical Service Channel (OSC) communicating to adjacent nodes of each of the plurality of degrees; and a controller configured to obtain monitoring data for at least one channel at degree of the plurality of degrees; detect a fault on the at least one channel, wherein the fault is an intra-node fault upstream of the degree; and cause transmission of a channel fault indicator over the OSC downstream of the fault to at least one downstream node along a path of the faulted channel, wherein restoration is triggered based on the channel fault indicator. The restoration can include rerouting the faulted channel exclusive of the fault which is internal to the node. One of i) the fault is an intra-node fiber fault for degree-to-degree connectivity, and ii) the plurality of degrees can be implemented in separate hardware such that the fault is a partial failure of one part of the separate hardware. The channel fault indicator can include a unique node identifier, a from degree port, a to degree port, and a type of the fault.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for triggering mesh restoration in networks due to intra-node faults, such as where a node is partially faulted preventing connectivity through only a subset of the node. The systems and methods detect per channel faults (optical power degradation, Loss of Signal (LOS), etc.) at an intermediate node level by the local OADM degree, irrespective of the node's control plane ability. A new per channel fault flag is propagated downstream relative to the fault allowing downstream control plane nodes to know the exact location of the fault as well as identifying which intra-node fiber connections are involved, or in other words, the intra-node degree to degree fiber connections to avoid for future restoration. The new fault indicator (flag) assures downstream nodes that the "line fault" is a fault taking place within the photonic line or path, and is not a multiplexer/demultiplexer structure fault, to trigger restoration for bi-directional photonic services, even though no fault is visible to them in the transmit direction.

The systems and method provide control plane source and destination nodes notification of individual channel faults and associated locations, i.e., the type of fault and the specific faulted intra-node connections. Control plane originating nodes then know for sure that the channel fault is traffic impacting. Receiving such fault notification in the receiving direction justifies a mesh-restoration in the transmit direction even though the transmit direction has no indication of downstream faults. The originating nodes know that the channel fault is due to fiber fault, line facing equipment failure, or electrical power failure in upstream degrees within the line system (i.e., within the optical path) and justifies a mesh-restoration. Note, if the fiber fault is at the Tx or Rx multiplexer/demultiplexer structure, then there would be no restoration benefit even if the restoration takes place to another path as the multiplexer/demultiplexer structure will be common regardless of path selection, at the end points thereby preventing restoration.

The systems and methods eliminate the originating nodes' dependency on the control plane nodes' fault notification from intermediate OADM nodes, i.e., the notification from the controller of the control plane. The systems and methods enable other control plane nodes to know about faulty intra-node degree connections or adjacencies within an intermediate node and allows them to re-route traffic using other "good" degree connections at that intermediate node or other nodes. The systems and methods provide a detection mechanism for the originating control plane nodes to be informed about the faulty degree connectivity in the Optical Multiplex Section (OMS) without relying on control plane processing at the faulty node, as well as, enabling per channel restoration without detecting an OMS fault.

Optical Network

Figure 1:
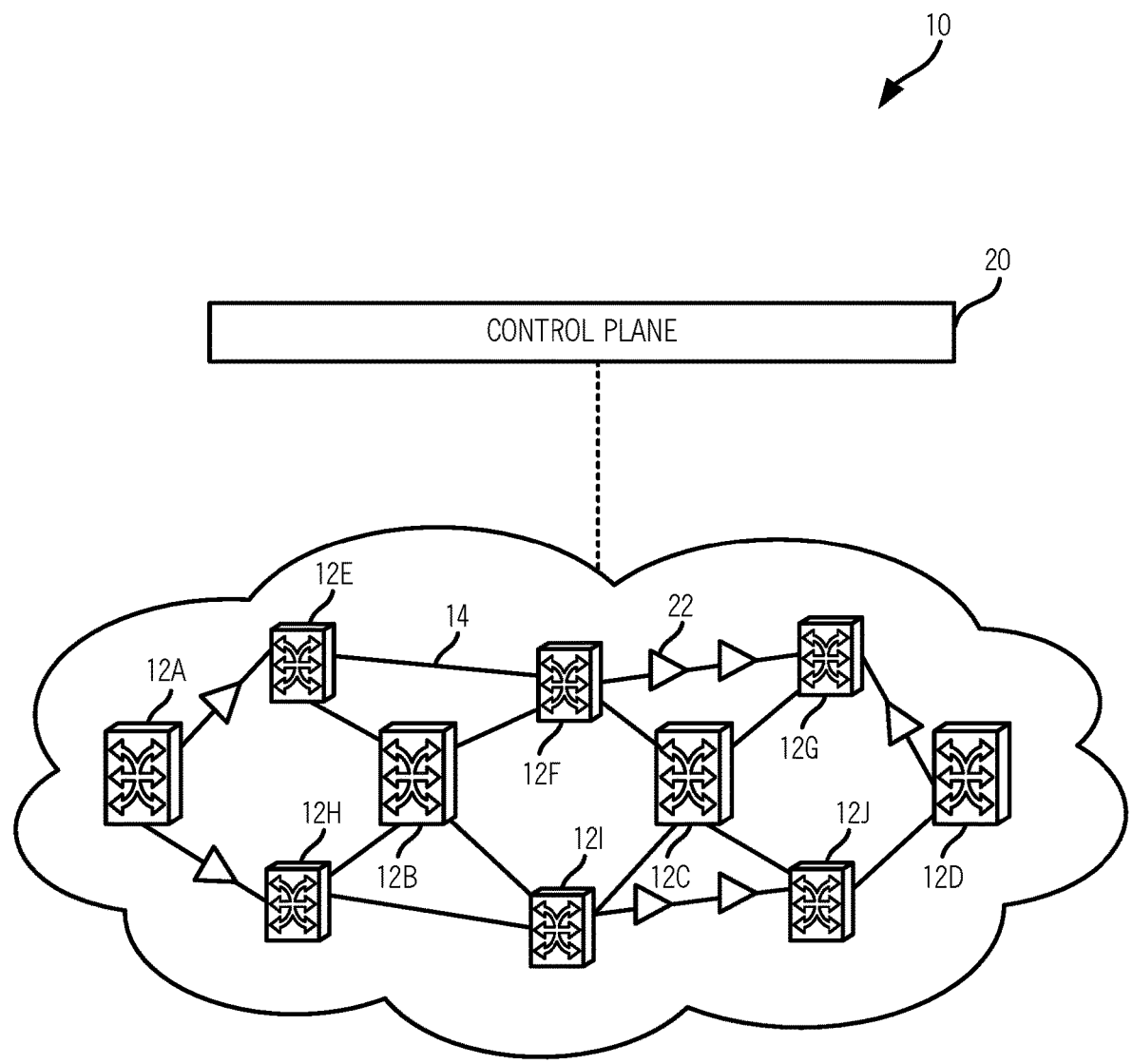
FIG. 1 is a network diagram of an example optical network with interconnected Reconfigurable Optical Add/Drop Multiplexer (ROADM) nodes.

FIG. 1 is a network diagram of an example optical network 10 with interconnected Reconfigurable Optical Add/Drop Multiplexer (OADM) nodes 12 (labeled as 12A-12J). The ROADM nodes 12 are interconnected by a plurality of links 14. The ROADM nodes 12 provide functionality for the photonic layer (e.g., Layer 0) (e.g., multiplexing, amplification, optical routing, wavelength conversion/regeneration, local add/drop, wavelength switching, etc.) including control via a control plane 20. The optical network 10 can also include intermediate amplifiers 22 and/or regenerators (which are omitted for illustration purposes) on the links 14. The optical network 10 is illustrated, for example, as an interconnected mesh network, and those of ordinary skill in the art will recognize the network 10 can include other architectures, with more ROADM nodes 12 or with fewer ROADM nodes 12, with additional amplifiers 22, with additional network elements and hardware (e.g., network equipment at Layers 1, 2, 3, etc.), Those of ordinary skill in the art will recognize the systems and methods described herein can be used in any network having a control plane, and the optical network 10 is merely presented for illustration purposes.

The optical network 10 can include various services or calls between the ROADM nodes 12. In the examples described herein, the services or calls are wavelengths and can be an SNC, an LSP, etc., and each service or call is an end-to-end path or an end-to-end signaled path. From the view of the client signal contained therein, each service or call is seen as a single network segment. The control plane 20 operates on and/or between the ROADM nodes 12 in a distributed manner. The control plane 20 includes software, processes, algorithms, etc. that control configurable features of the optical network 10, such as automating discovery of the ROADM nodes 12, capacity on the links 14, port availability on the nodes ROADM 12, connectivity between ports; dissemination of topology and bandwidth information between the ROADM nodes 12; calculation and creation of paths for calls or services; network level protection and restoration; and the like. In an embodiment, the control plane 20 can utilize ASON, GMPLS, OSRP, MPLS, Open Shortest Path First (OSPF), Intermediate System-Intermediate System (IS-IS), or the like. Those of ordinary skill in the art will recognize the optical network 10 and the control plane 20 can utilize any type of control plane for controlling the ROADM nodes 12 and establishing, maintaining, and restoring calls or services between the ROADM nodes 12.

In the terminology of ASON and OSRP, SNCs are end-to-end signaled paths or calls, which from the point of view of a client signal, each is a single network segment. In GMPLS, the connections are an end-to-end path referred to as LSPs. In Software Defined Networking (SDN), such as in OpenFlow, services are called "flows." In the various descriptions herein, reference is made to SNCs for illustration only of an embodiment of the systems and methods. Those of ordinary skill in the art will recognize that SNCs, LSPs, flows, or any other managed service in the network can be used with the systems and methods described herein for end-to-end paths. Also, as described herein, the term services is used for generally describing connections such as SNCs, LSPs, flows, etc. in the optical network 10.

Nodal Configuration

Figure 2:
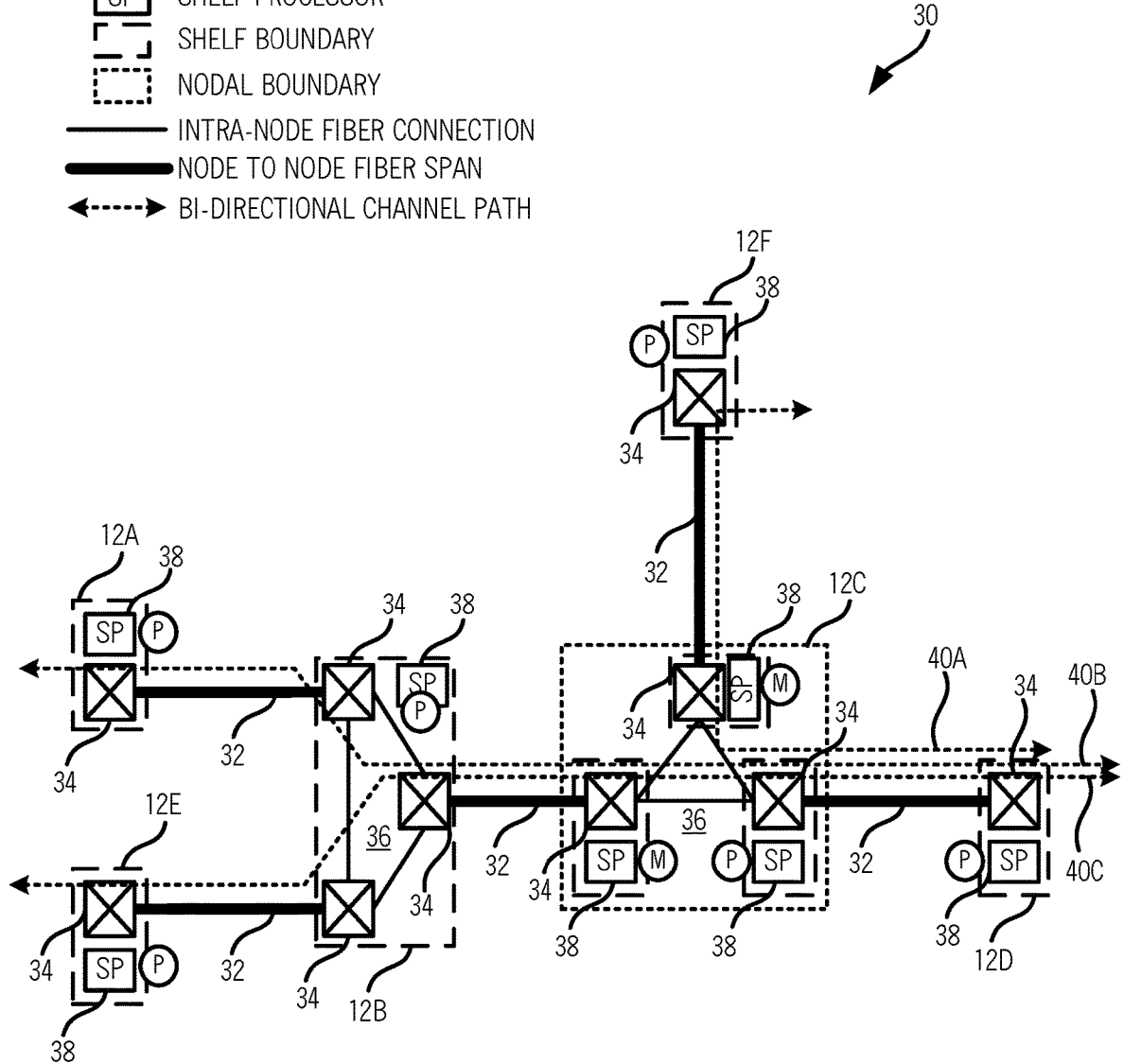
FIG. 2 is a network diagram of a portion of the optical network illustrating details of a ROADM node 12C which has control plane functionality distributed through multiple shelves.

FIG. 2 is a network diagram of a portion 30 of the optical network 10 illustrating details of a ROADM node 12C which has control plane functionality distributed through multiple shelves. In the portion 30, the ROADM node 12C is connected to ROADM nodes 12B, 12D, 12F via node-to-node fiber spans 32, i.e., inter-node links. The ROADM node 12B is connected to ROADM nodes 12A, 12E via different node-to-node fiber spans 32. FIG. 2 also illustrates various aspects internal to the ROADM nodes 12. Of node, FIG. 2 is shown in a simplified manner and a practical implementation may include additional components (e.g., local add/drop transceivers, etc.) in the ROADM nodes 12 which are omitted for illustration purposes.

The ROADM nodes 12B, 12C are three-degree nodes and the ROADM nodes 12A, 12D, 12E, 12F are single degree nodes. Each degree is formed by an OADM structure 34 which enables multiple optical channels to be interfaced to the associated node-to-node fiber span 32. For example, the OADM structure 34 can include one or more Wavelength Selective Switches (WSS), multiplexer/demultiplexers, optical amplifiers, combiners/splitters, etc. For the one-degree nodes at the ROADM nodes 12A, 12D, 12E, 12F, the OADM structure 34 has interfaces for local add/drop, i.e., these ROADM nodes 12A, 12D, 12E, 12F only include a single OADM structure 34. For the three-degree nodes at the ROADM nodes 12B, 12C, there are three OADM structures 34 which are interconnected to one another via intra-node fiber connections 36.

Each of the ROADM nodes 12A, 12B, 12C, 12D, 12E are control plane-enabled, i.e., the optical network implements a distributed Layer 0 control plane architecture. All of the ROADM nodes 12A, 12B, 12D, 12E are implemented in a single shelf. That is, the equipment such as the OADM structure 34 and a Shelf Processor (SP) 38 are in a single physical shelf, chassis, etc. or are in communication with one another. As described herein, a shelf may be physical (all equipment physically in the same shelf) or logical (equipment in different locations, but logically connected). For example, the physical implementation may include a shelf with multiple slots where modules are selectively inserted, a so-called pizza box which is a rack-mountable, self-contained unit typically a couple Rack Unit (RU) high. In this scenario of the single shelf, the shelf processor 38 fully controls all of the equipment at the ROADM nodes 12A, 12B, 12D, 12E and is designated as primary (P) for that node.

The ROADM node 12C illustrates a multiple shelf configuration where there are three separate shelves each forming one of the degrees at the ROADM node 12C. Thus, the ROADM node 12C includes three shelves and three shelf processors 38. However, for management, the three shelves at the ROADM node 12C are consolidated under a Single Target Identifier (TID), where one shelf serves as Primary (P) and the rest serve as a Member (M) in a consolidation framework.

The distributed control plane 20 operates through each of the shelf processors 38. In the single shelf nodes, the single shelf processor 38 provides the control plane 20 functionality for that node. For the ROADM node 12C, the primary shelf processor 38 implements the control plane 20 functionality for that node. In other words, all shelves and photonic degrees in the ROADM node 12C are consolidated under a single Layer 0 control plane controller that resides on one of the shelves in the node.

Control plane communication between the ROADM nodes 12 can be via an Optical Service Channel (OSC) (also referred to as an Optical Supervisory Channel) which operates over the node-to-node fiber spans 32. For example, the OSC can be an out-of-band wavelength (relative to optical channels and the optical amplifier window) which carries Operations, Administration, Maintenance, and Provisioning (OAM&P) data as well as control plane signaling, topology updates, etc.

Also, for illustration purposes, services 40 (labeled as services 40A, 40B, 40C) are illustrated between the ROADM nodes 12, e.g., wavelengths. Note, at the ROADM nodes 12B, 12C some of the services traverse between degrees via the intra-node fiber connections 36. The service 40A is between the ROADM node 12F and the ROADM node 12D via the ROADM node 12C, the service 40B is between the ROADM node 12A and the ROADM node 12D via the ROADM nodes 12B, 12C, and the service 40C is between the ROADM node 12E and the ROADM node 12D via the ROADM nodes 12B, 12C.

Again, the ROADM node 12 is an optical, Layer 0 network element for illustration purposes. Those skilled in the art will recognize the systems and methods described herein contemplate operation with any protocol, layer, etc. at a control plane node where there can be a partial failure impacting the operation of the distributed control plane 20. In particular, optical networking is one example where a single node may have multiple shelf processors, such as where different degrees are implemented in different shelves. This may also be applicable to a multi-chassis switch for Optical Transport Network (OTN), Ethernet, etc.

Nodal Fault Scenarios

Figure 3:
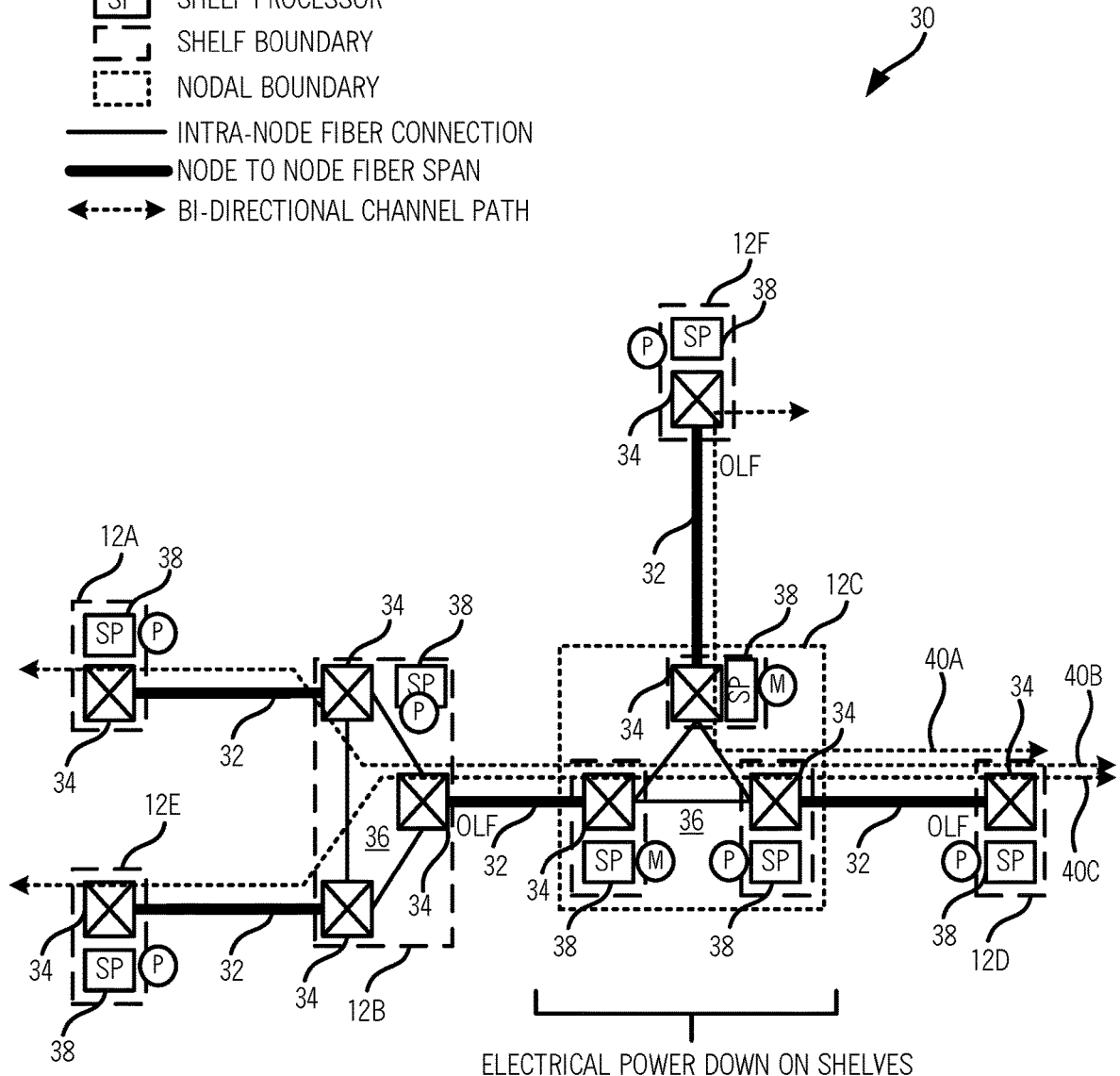
FIG. 3 is a network diagram of the portion of the optical network illustrating details of loss of the entire ROADM node 12C.

FIG. 3 is a network diagram of the portion 30 of the optical network illustrating details of loss of the entire ROADM node 12C. For example, the entire ROADM node 12C can be lost such as due to an electrical power failure or some other failure type that takes out all shelves and shelf processors 38. That is, in this example, power goes down for all shelves in ROADM node 12C that brings down both OSC and total power input at the far end amplifiers (part of the OADM structure 34), which in turn, triggers an Optical Line Fail (OLF) at neighboring nodes, in this example, the ROADM nodes 12B, 12D, 12F. The OLF condition allows neighboring control plane nodes to declare a line down condition, which is then broadcasted to all other dependent control plane nodes (e.g., the ROADM nodes 12A, 12E) that then triggers mesh restoration (where the mesh registration is controlled by a source node for each service 40). In this example, the ROADM nodes 12A, 12E, 12B, 12F, 12D trigger restoration elsewhere in the optical network 10 on diverse routes avoiding links to the ROADM node 12C (alternate routes not shown in FIG. 3 for simplicity).

Figure 4:
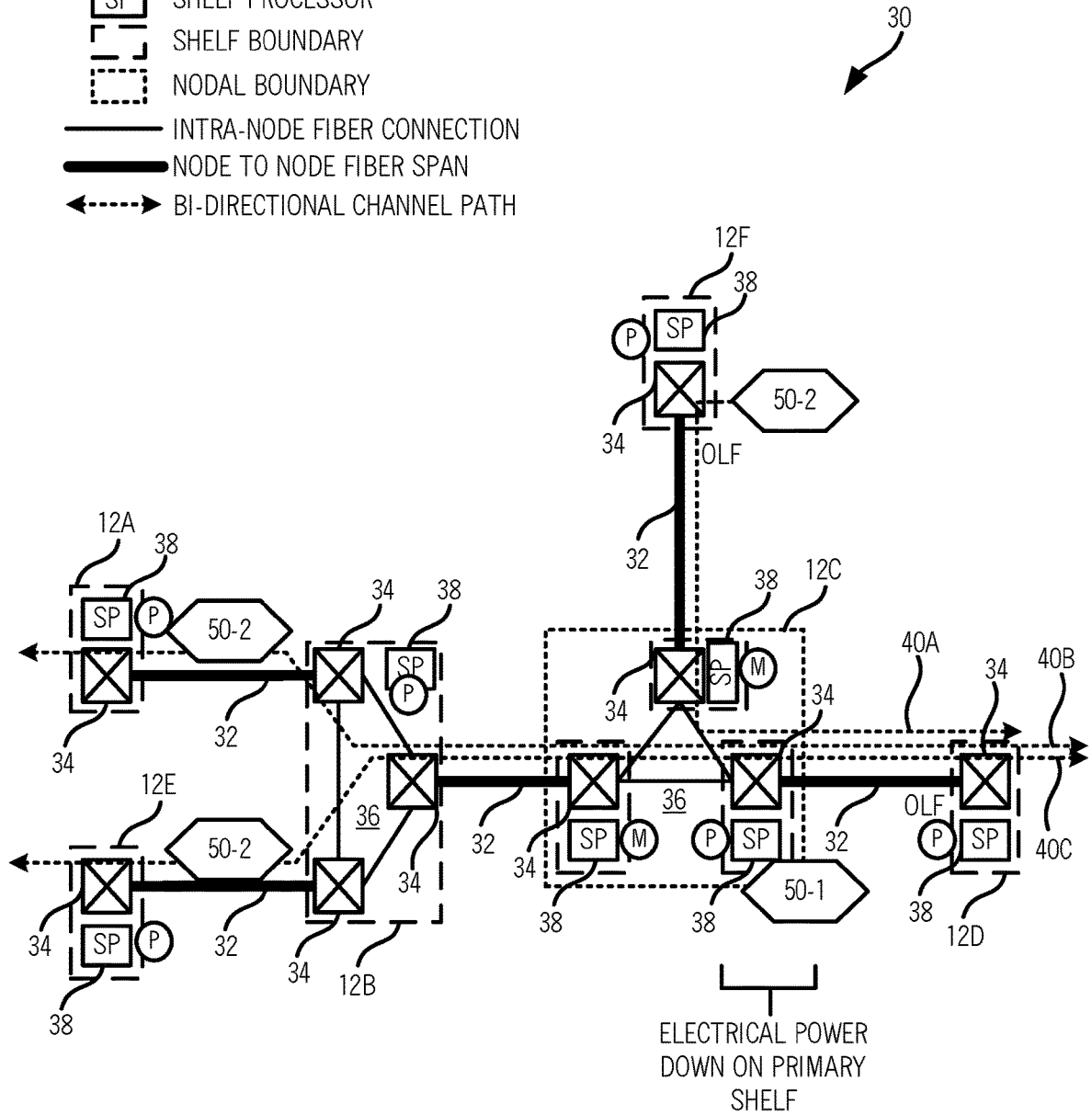
FIG. 4 is a network diagram of the portion of the optical network illustrating details of loss of the primary shelf only in the ROADM node 12C.

FIG. 4 is a network diagram of the portion 30 of the optical network 10 illustrating details of loss of the primary shelf only in the ROADM node 12C. FIG. 4 illustrates a problem associated with the multiple shelf configuration at the ROADM 12C, namely if the control plane shelf processor 38 only goes down at the primary shelf in the ROADM node 12C it is not possible to correlate the location and root cause of optical channel faults. Thus, it is not possible to propagate other upstream fault information to downstream control plane nodes resulting in a failure in mesh restoration.

At a step 50-1, in this example, electrical power goes down for the primary shelf in the ROADM node 12C that brings down both the OSC and total power input at the far end amplifiers, which in turn, triggers OLF at the neighboring node associated only with the faulted one-degree connection, i.e., at the ROADM node 12D. The other neighboring nodes associated with other degrees at the ROADM node 12C, which are operational, do not receive any notification from the troubled ROADM node 12C, since it is the primary shelf processor 38 of that control plane node residing on primary shelf that goes down.

At step 50-2, traffic remains in a faulted state for the services 40A, 40B, 40C, but no mesh restoration takes place. The ROADM nodes 12A, 12E, 12F downstream to the fault location see faults locally, and know about the loss of communication with the faulted control plane ROADM node 12C, but fail to figure out the exact location and root cause of that fault as other fiber faults upstream or downstream of the faulted node fail to propagate to downstream nodes. For example, the ROADM nodes 12A, 12E, 12F downstream from the ROADM node 12C cannot tell if the channels faulted at receiving direction are due to electrical power fault at the ROADM node 12C, or due to an intra-node fiber fault at the ROADM node 12C or due to a fault anywhere upstream of the ROADM node 12C.

It is important for downstream nodes to know the exact location and root cause of channel faults in order to provide successful mesh restoration, i.e., a source node recomputing a route for mesh restoration needs to know the exact fault location to reroute successfully. For example, if the fault is a fiber fault at the multiplexer structure (in the OADM structure 34) at the source node, then there would be no benefit with Layer 0 restoration, and so on. Similarly, nodes upstream to the faulted ROADM node 12C only know about the loss of communication with a downstream node, but cannot tell if the loss of communication is due to an issue with the shelf processor 38 or if due to electrical power failure. They also do not know if channels are faulted after the faulted ROADM node 12C, i.e., the exact location of the fault.

Again, FIG. 4 illustrates the problem of a node in a control plane network which is partially failed and non-responsive in the control plane 20. Since the control plane 20 is down at the ROADM node 12C because of the failure of the primary shelf processor 38, there is no correlation of the location and root cause of the channel faults. Further, the channel faults do not propagate.

Process for Triggering Restoration Based on Non-Responsive Control Plane Nodes

Figure 5:
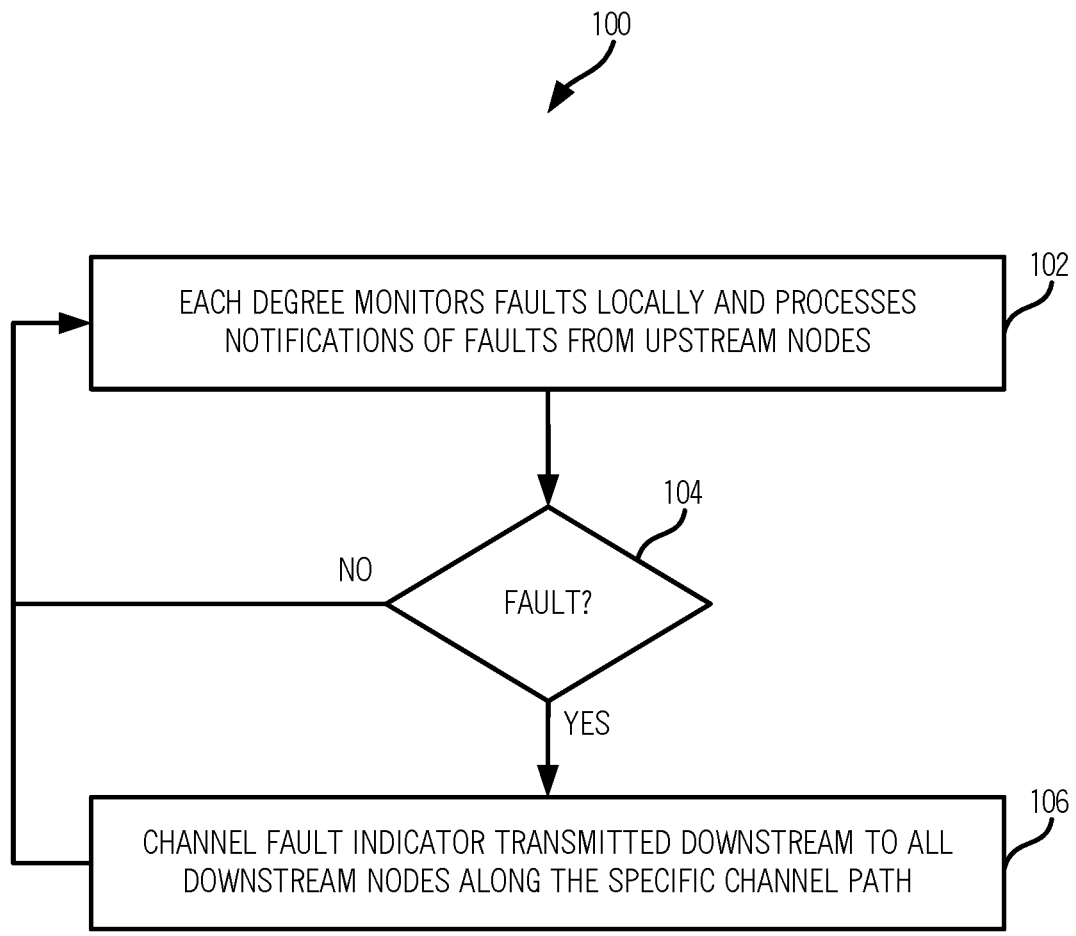
FIG. 5 is a flowchart of a process for triggering restoration based on non-responsive control plane nodes due to a partial node failure which affects control plane operation at a node.

FIG. 5 is a flowchart of a process 100 for triggering restoration based on non-responsive control plane nodes due to a partial node failure which affects control plane operation at a node. Specifically, the process 100 solves the aforementioned problem at the ROADM node 12C in FIG. 4 where there is an intra-node fault which affects the control plane operation. This partial node failure can be due to a power failure that takes down one shelf in the multi-shelf node, a failure of the primary shelf processor 38, etc. The objective of the process 100 is to enable control plane nodes (e.g., the ROADM nodes 12) to determine the exact location of a fault due to the partial node failure. The process 100 is implemented by a node, such as the ROADM node 12C, interacting with other nodes, such as the ROADM nodes 12A, 12B, 12D, 12E. The communication is over a management channel such as the OSC, another type of out-of-band communication, etc. The management channel can also be in-band in overhead, such as the General Communication Channel (GCC) in Optical Transport Network (OTN), the Data Communication Channel (DCC) in SONET, etc. For illustration purposes, the management channel is described as the OSC and the control plane nodes are described as OADM/ROADM in an optical network implementing a distributed Layer 0 control plane.

Each degree monitors faults and processes notification of faults from upstream nodes (step 102). For example, each photonic degree checks for optical channel fault locally (or receives notifications) at its input switching point (the OADM structure 34) and raises a diagnostic defect indicator if a channel fault is detected. The channel fault can be raised if per channel power at the switch input falls below a certain threshold or if a Loss of Signal (LOS) is raised at the switch total power monitoring point, where the power is coming from other neighboring degrees. In a ROADM node, the OADM structure 34 can include an Optical Channel Monitor (OCM) which operates to monitor per channel power using a power tap and photodetector.

Responsive to detecting a fault or receiving an upstream notification (step 104), a channel fault indicator is transmitted downstream to all downstream nodes along the specific channel path (step 106). In an optical network, the channel fault indicator can be an Optical Channel Fault Indicator (OCH-FI) for each channel is then transmitted downstream to the fault to all downstream nodes along the specific channel path.

In the process 100, the channel fault processing is performed locally at each shelf by the shelf processor regardless its designation as Primary (P) or Member (M) or its Layer 0 control plane residing status. For example, the two working shelf processors 38 in the ROADM node 12C in FIG. 4 still perform the process 100 despite the loss of the control plane 20 at this node with the failure of the primary shelf processor 38. When each downstream node receives the fault indicator for specific channel, it knows for sure that the channel's LOS status is coming from an upstream node, and it is due to either a line fiber fault or due to an electrical power failure due to which a mesh restoration is justified (i.e., it confirms that it is not a mux structure fault at the source node).

As described herein, the control plane 20 works fine when the entire ROADM node 12C is faulted—all upstream and downstream nodes can detect and determine the ROADM node 12C is down. The process 100 provides generation and dissemination of channel fault indicators (OCH-FI) based on detection of failures including failures detected based on the intra-node connections 36. That is, conceptually, the process 100 envisions the intra-node connections 36 in a similar manner as the node-to-node fiber spans 32. By isolating faults in the intra-node connections 36, it is now possible for the control plane 20 to reroute connections to avoid the specific faulted degree in the ROADM node 12C.

Example Operation

Figure 6:
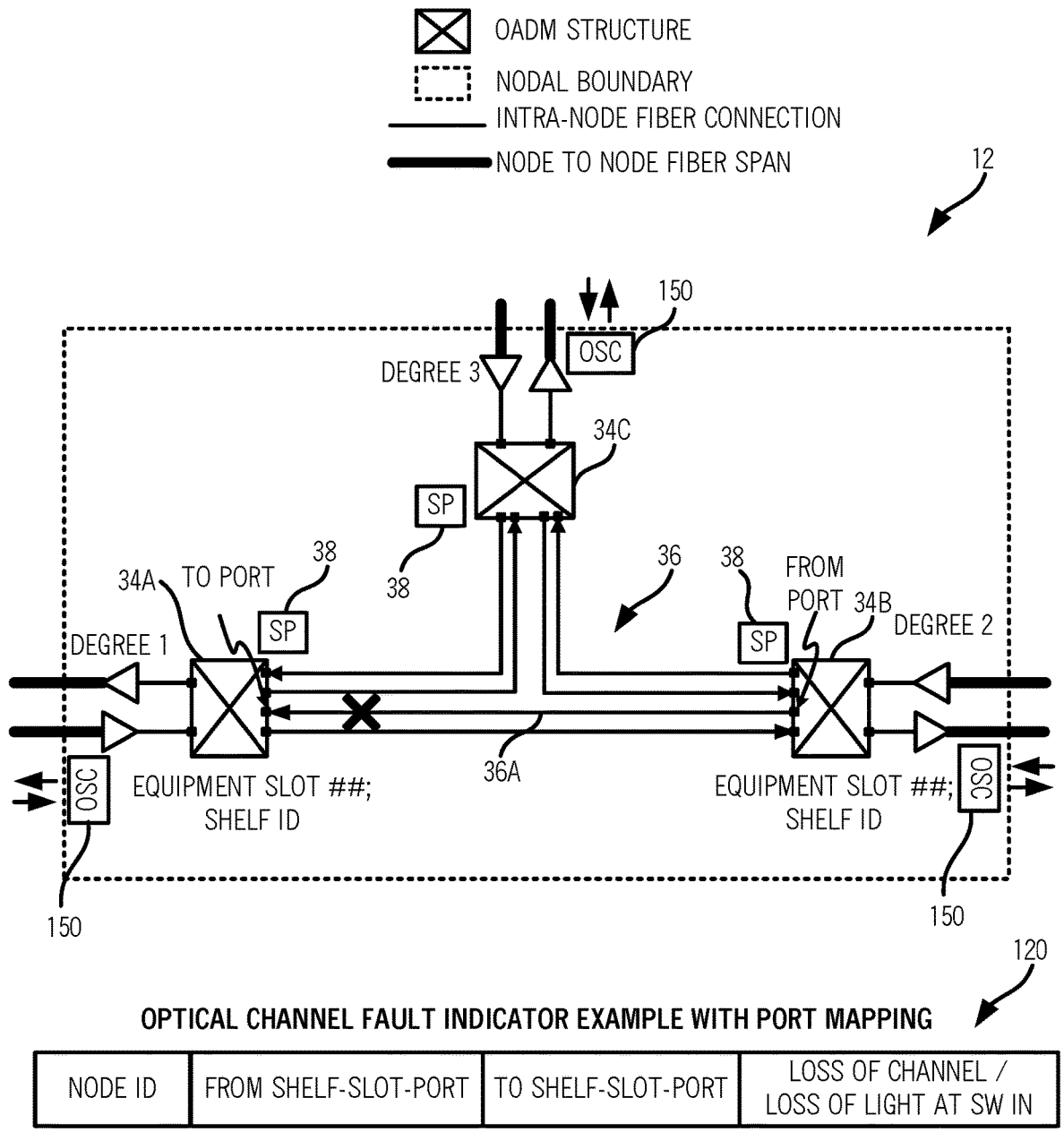
FIG. 6 is a block diagram of the intra-node connections in a ROADM node for illustrating the operation of the process.

FIG. 6 is a block diagram of the intra-node connections 36 in a ROADM node 12 for illustrating the operation of the process 100. As described herein, the ROADM node 12 includes three degrees 1, 2, 3 formed by three OADM structures 34A, 34B, 34C in separate shelves with separate shelf processors 38. In the fault example, there is a fault on a "from" port on the OADM structure 34B to a "to" port on the OADM structure 34A. Again, the process 100 enables the control plane 20 to reroute connections not to avoid the entire ROADM node 12, but to avoid the faulted port with the node.

An example of an OCH-FI 120 is illustrated in FIG. 6. Again, the OCH-FI 120 can be generated due to a fault located at an OADM structure 34 switch port. The OCH-FI 120 can include: a) the node unique identifier (Node ID), b) "from" switch port in terms of shelf ID—equipment slot—equipment switch port, c) "to" switch port in terms of shelf ID—equipment slot—equipment switch port, and d) Type of channel fault, e.g., channel power degraded by a major amount (such as >10 dB) or total Loss of Light (LOL) at the switch input port.

As described herein, the OCH-FI 120 is propagated to all downstream nodes along each channel path. Each downstream node may generate its own fault indicator (OCH-FI 120) due to loss of light at its switch input port. However, the locally generated indicator is inhibited if an indicator is received from an upstream node. This ensures locality of the fault is maintained. Knowing the fault type will allow originating nodes (which manage the services 40) to take appropriate restoration decisions based on any pre-defined preference. For example, restoration can be triggered if channel power is degraded only by a certain amount or if Loss of Signal (LOS) is detected.

The OCH-FI 120 specifically tells each downstream node where the fault took place and the specific degree to degree connections 36A to avoid for future restoration attempts. For example, for a fiber fault between degrees 2, 1 in FIG. 6, only the connections 36A between those degrees cannot be used for future restoration, but the connections between other degrees such as degree 1, 3 and degrees 3, 2 can be used for mesh-restoration. For the power down use case at degree 2, all connections involving degree 2 cannot be used for future restoration, but the connections between degrees 1, 3 can be considered for future path computation.

Again, if the local processing shelf processor 38 goes down on the photonic degree where the fault took place at the switch input port, then it cannot generate the channel fault indicator, which is sent over the OSC or the like. However, the downstream nodes pick up the loss of channel at its input switch port, using the process 100. In such case, if only loss of channel is detected but not loss of light at the switch input port, then the degree-to-degree inter-connectivity is not considered faulted.

Although, the issue is described for faults in intermediate nodes, the same process 100 can be applied to detect degree connectivity faults at originating or terminating nodes as well, where traffic can be re-routed to other good degrees (in this case, the control plane shelf processor 38 has to stay alive to trigger restoration).

In an embodiment, the ROADM node 12 is in the optical network 10 utilizing the control plane 20 for triggering mesh restoration due to intra-node faults. The ROADM node 12 includes a plurality of degrees 1, 2, 3 each including an OADM structure 34A, 34B, 34C; a plurality of intra-node connections 36 between the plurality of degrees 1, 2, 3; an Optical Service Channel (OSC) 150 communicating to adjacent nodes of each of the plurality of degrees 1, 2, 3; and a controller (shelf processor 38) configured to obtain monitoring data for each channel at the plurality of degrees; detect a fault on a channel, wherein the fault is an intra-node fault between the one or more degrees; and cause transmission of a channel fault indicator 120 over the OSC 150 downstream of the fault to all downstream nodes along a path of the faulted channel, wherein restoration is triggered based on the channel fault indicator 120.

The restoration can include rerouting the faulted channel exclusive of the fault which is internal to the ROADM node 12. The fault can an intra-node fiber fault for degree-to-degree connectivity. Also, the plurality of degrees can be implemented in separate hardware such that the fault is a partial failure of one part of the separate hardware. The channel fault indicator can include a unique node identifier, a from port of the plurality of degrees, a to port of the plurality of degrees, and a type of the fault.

Process for Optical Nodes

Figure 7:
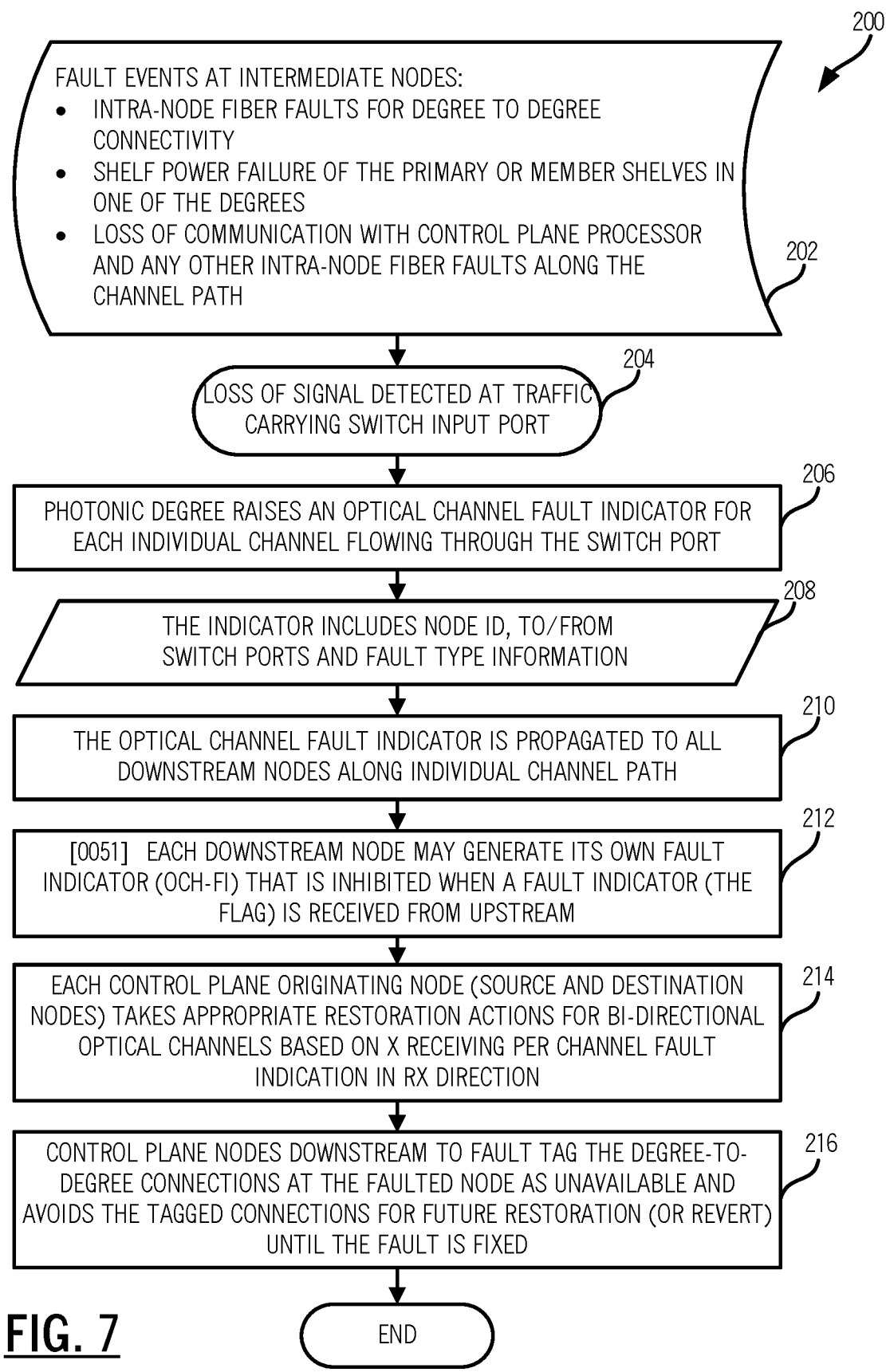
FIG. 7 is a flowchart of a process for an optical network to manage partial node failures affecting the control plane.

FIG. 7 is a flowchart of a process 200 for an optical network to manage partial node failures affecting the control plane. The process 200 is implemented based on fault events at intermediate nodes (step 202). The fault events can include intra-node fiber faults for degree-to-degree connectivity (intra-node fiber connections 36), shelf power failure of the primary or member shelves in one of the degrees, loss of communication with control plane processor and any other intra-node fiber faults along the channel path, etc. The fault events can be detected by a Loss of Signal detected or the like on a traffic carrying switch input port (step 204).

The associated photonic degree raises an optical channel fault indicator (OCH-FI) for each individual channel flowing through the switch port (step 206). The OCH-FI includes node ID, to/from switch ports and fault type information (step 208). The OCH-FI is propagated to all downstream nodes along individual channel path (step 210).

Each downstream node may generate its own fault indicator (OCH-FI) that is inhibited when a fault indicator (the flag) is received from upstream (step 212). Each control plane originating node (source and destination nodes) takes appropriate restoration actions for bi-directional optical channels based on receiving per channel OCH-FI in the receive direction (step 214). Control plane nodes downstream to the fault tag the degree-to-degree connections at the faulted node as unavailable and avoids the tagged connections for future restoration (or revert) until the fault is fixed (step 216).

Figure 8:
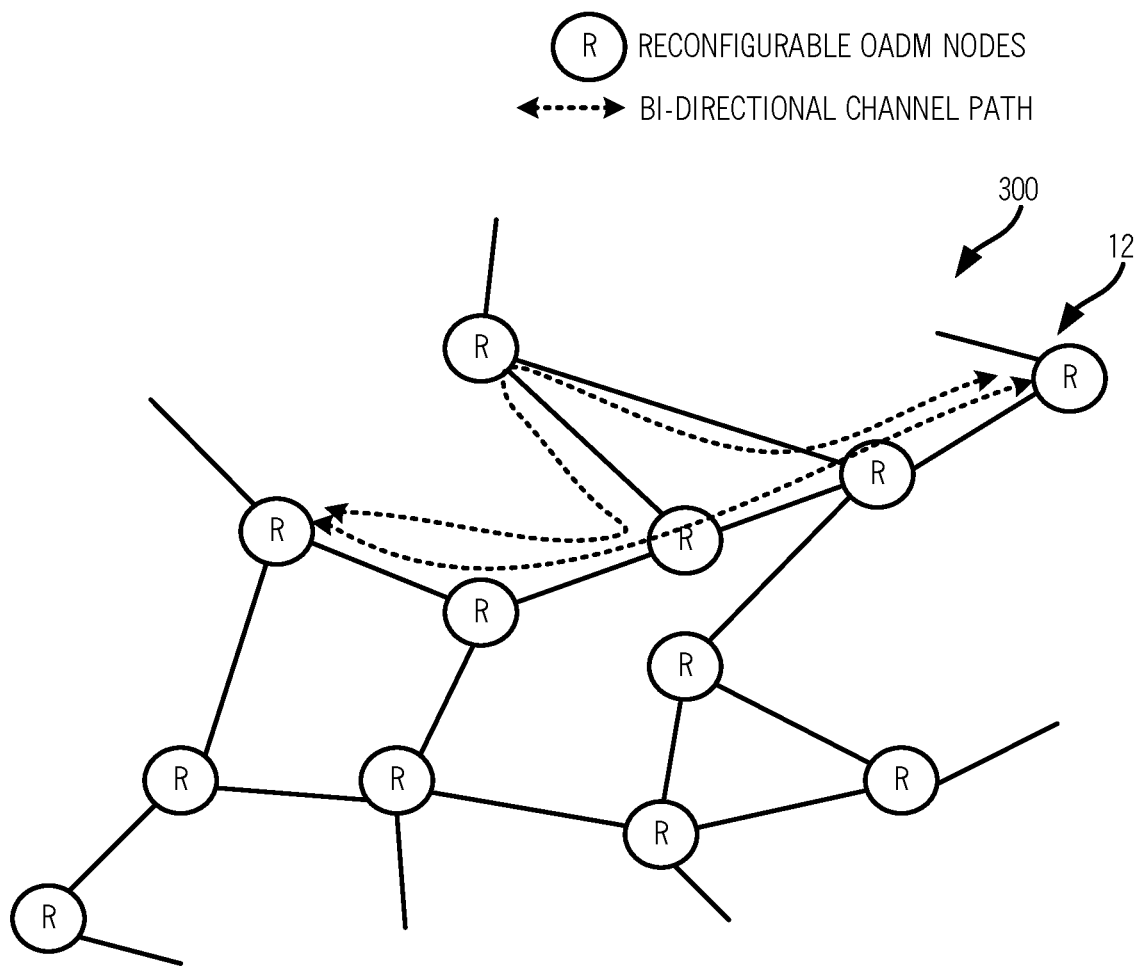
FIG. 8 is a network diagram of an optical network with additional ROADM nodes.

FIG. 8 is a network diagram of an optical network 300 with additional ROADM nodes 12. Of note, the portion 30 in FIG. 2 illustrated a small subset of an optical network. The optical network 300 illustrates a larger optical network for implementation of the process 100. Of course, any size is contemplated for the optical network.

Figure 9:
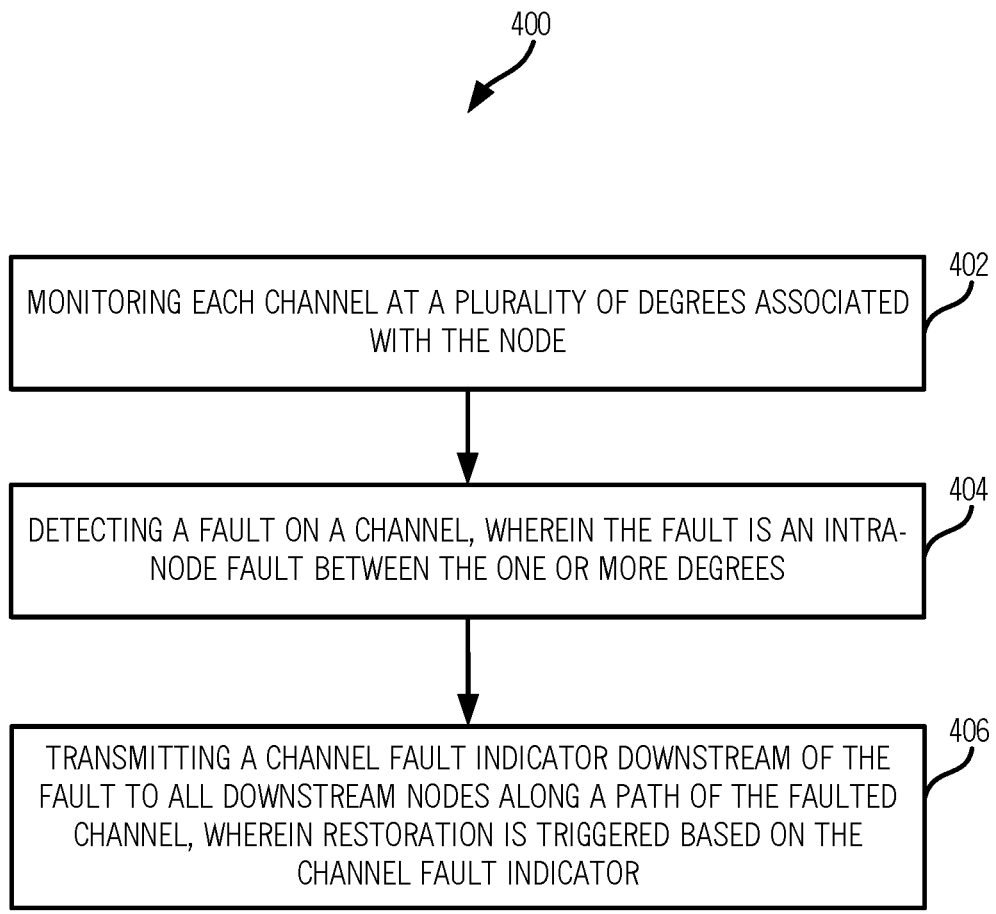
FIG. 9 is a flowchart of a process implemented in a node in a network utilizing a control plane for triggering mesh restoration due to intra-node faults.

Process Utilizing a Control Plane for Triggering Mesh Restoration Due to Intra-Node Faults FIG. 9 is a flowchart of a process 400 implemented in a node 12 in a network 10 utilizing a control plane 20 for triggering mesh restoration due to intra-node faults. The process 400 includes monitoring each channel at a plurality of degrees associated with the node (step 402); detecting a fault on a channel, wherein the fault is an intra-node fault between the one or more degrees (step 404); and transmitting a channel fault indicator downstream of the fault to all downstream nodes along a path of the faulted channel, wherein restoration is triggered based on the channel fault indicator (step 406).

The restoration can include rerouting the faulted channel exclusive of the fault which is internal to the node. A rerouted path for the faulted channel can be still through the node exclusive of the fault. The fault can be an intra-node fiber fault for degree-to-degree connectivity. The plurality of degrees can be implemented in separate hardware such that the fault is a partial failure of one part of the separate hardware. The channel fault indicator can include a unique node identifier, a from port of the plurality of degrees, a to port of the plurality of degrees, and a type of the fault.

The process 400 can further include receiving a second channel fault indicator from an upstream node for a second channel; and transmitting the second channel fault indicator downstream of the second fault to all downstream nodes along a path of the second faulted channel and suppressing a subsequent channel fault indicator from the node. Each of the plurality of degrees can include an Optical Service Channel (OSC) or using equipment for signaling over a channel or in-band, for communication to associated adjacent nodes, wherein the transmitting is over the OSC, the channel or in-band.

In another embodiment, an apparatus disposed in a node in a network utilizing a control plane for triggering mesh restoration due to intra-node faults includes circuitry configured to monitor each channel at one or more degrees associated with the node; circuitry configured to detect a fault on a channel, wherein the fault is an intra-node fault between the one or more degrees; and circuitry configured to cause transmission of a channel fault indicator downstream of the fault to all downstream nodes along a path of the faulted channel, wherein restoration is triggered based on the channel fault indicator.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented in a node in a network utilizing a control plane for triggering mesh restoration due to an intra-node fault, the method comprising:
    monitoring at least one channel at a degree of a plurality of degrees associated with the node;
    detecting a fault on the at least one channel, wherein the fault is an intra-node fault upstream of the degree; and
    transmitting a channel fault indicator downstream of the fault to at least one downstream node along a path of the faulted channel, wherein restoration is triggered based on the channel fault indicator,
    wherein the fault is an intra-node fault that affects degree-to-degree connectivity and comprises any of a fiber fault, a power failure on a shelf or on active components of an associated degree, and a loss of communication with a control plane processor, and wherein the channel fault indicator includes information related to the intra-node fault to identify the intra-node fault by the control plane including an identifier of the node and direction information for the degree-to-degree connectivity.

2. The method of claim 1, wherein the restoration comprises rerouting the faulted channel exclusive of the fault which is internal to the node.

3. The method of claim 2, wherein a rerouted path for the faulted channel can still traverse the node through other non-faulted degrees exclusive of the fault.

4. The method of claim 1, wherein the plurality of degrees are implemented in separate hardware such that the fault is a partial failure of one part of the separate hardware.

5. The method of claim 1, comprising:
receiving a second channel fault indicator from an upstream node for a second channel; and
transmitting the second channel fault indicator downstream of the second fault to at least one remaining downstream node along a path of the second faulted channel and suppressing a subsequent channel fault indicator from the node.

6. The method of claim 1, wherein each degree comprises one of i) an Optical Service Channel (OSC) and ii) equipment for signaling over a signaling channel or in-band, for communication to associated adjacent nodes, wherein the transmitting is over the OSC, the signaling channel, or in-band.

7. An apparatus disposed in a node in a network utilizing a control plane for triggering mesh restoration due to an intra-node fault, the apparatus comprising:
circuitry configured to monitor at least one channel at a degree of a plurality of degrees associated with the node;
circuitry configured to detect a fault on the at least one channel, wherein the fault is an intra-node fault upstream of the degree; and
circuitry configured to cause transmission of a channel fault indicator downstream of the fault to at least one downstream node along a path of the faulted channel, wherein restoration is triggered based on the channel fault indicator,
wherein the fault is an intra-node fault that affects degree-to-degree connectivity and comprises any of a fiber fault, a power failure on a shelf or on active components of an associated degree, and a loss of communication with a control plane processor, and
wherein the channel fault indicator includes information related to the intra-node fault to identify the intra-node fault by the control plane including an identifier of the node and direction information for the degree-to-degree connectivity.

8. The apparatus of claim 7, wherein the restoration comprises rerouting the faulted channel exclusive of the fault which is internal to the node.

9. The apparatus of claim 8, wherein a rerouted path for the faulted channel can still traverse the node through other non-faulted degrees exclusive of the fault.

10. The apparatus of claim 7, wherein the plurality of degrees are implemented in separate hardware such that the fault is a partial failure of one part of the separate hardware.

11. The apparatus of claim 7, comprising:
circuitry configured to receive a second channel fault indicator from an upstream node for a second channel; and
circuitry configured to cause transmission of the second channel fault indicator downstream of the second fault to at least one remaining downstream node along a path of the second faulted channel and suppressing a subsequent channel fault indicator from the node.

12. The apparatus of claim 7, wherein each degree comprises one of i) an Optical Service Channel (OSC) and ii) equipment for signaling over a signaling channel or in-band, for communication to associated adjacent nodes, wherein the transmission is over the OSC, the signaling channel, or in-band.

13. An apparatus disposed in a node in a network utilizing a control plane for triggering mesh restoration due to an intra-node fault, the apparatus comprising:
circuitry configured to monitor at least one channel at a degree of a plurality of degrees associated with the node;
circuitry configured to detect a fault on the at least one channel, wherein the fault is an intra-node fault upstream of the degree;
circuitry configured to cause transmission of a channel fault indicator downstream of the fault to at least one downstream node along a path of the faulted channel, wherein restoration is triggered based on the channel fault indicator;
circuitry configured to receive a second channel fault indicator from an upstream node for a second channel; and
circuitry configured to cause transmission of the second channel fault indicator downstream of the second fault to at least one remaining downstream node along a path of the second faulted channel and suppressing a subsequent channel fault indicator from the node.

14. The apparatus of claim 13, wherein the restoration comprises rerouting the faulted channel exclusive of the fault which is internal to the node.

15. The apparatus of claim 14, wherein a rerouted path for the faulted channel can still traverse the node through other non-faulted degrees exclusive of the fault.

16. The apparatus of claim 13, wherein the plurality of degrees are implemented in separate hardware such that the fault is a partial failure of one part of the separate hardware.

17. The apparatus of claim 13, wherein each degree comprises one of i) an Optical Service Channel (OSC) and ii) equipment for signaling over a signaling channel or in-band, for communication to associated adjacent nodes, wherein the transmission is over the OSC, the signaling channel, or in-band.

18. The apparatus of claim 13, wherein the fault is an intra-node fault that affects degree-to-degree connectivity and comprises any of a fiber fault, a power failure on a shelf or on active components of an associated degree, and a loss of communication with a control plane processor.

19. The apparatus of claim 18, wherein the channel fault indicator includes information related to the intra-node fault to identify the intra-node fault by the control plane.

* * * * *